US007640195B2

(12) United States Patent
Von Zimmermann et al.

(10) Patent No.: US 7,640,195 B2
(45) Date of Patent: Dec. 29, 2009

(54) SYSTEMS AND METHOD FOR AUTOMATIC INTEGRATED DOCUMENT FILING WHEN LOGGING BUSINESS TRANSACTIONS

(75) Inventors: Peter Von Zimmermann, Angelbachtal (DE); Reiner Wallmeier, Wiesloch (DE); Olaf Duevel, Mannheim (DE); Dirk Henrich, Wiesloch (DE); Martin Schorr, Rauenberg (DE); Volker Schnuck, Münster (DE); Dietmar Nowotny, Dielheim (DE); Volker Ripp, Mannheim (DE)

(73) Assignee: SAP AG., Walldorf (DE)

( * ) Notice: Subject to any disclaimer, the term of this patent is extended or adjusted under 35 U.S.C. 154(b) by 0 days.

(21) Appl. No.: 10/529,231

(22) PCT Filed: Sep. 8, 2003

(86) PCT No.: PCT/EP03/09954
§ 371 (c)(1),
(2), (4) Date: Jan. 31, 2006

(87) PCT Pub. No.: WO2004/032005
PCT Pub. Date: Apr. 15, 2004

(65) Prior Publication Data
US 2006/0178956 A1     Aug. 10, 2006

(30) Foreign Application Priority Data
Sep. 27, 2002  (EP)  .............................. 02021648
Sep. 27, 2002  (EP)  .............................. 02021654
Dec. 20, 2002  (DE)  .............................. 102 61 121
Dec. 20, 2002  (DE)  .............................. 102 61 123

(51) Int. Cl.
*G07B 17/00* (2006.01)
(52) U.S. Cl. ......................................... 705/30; 705/26
(58) Field of Classification Search ................... 705/26, 705/27, 30
See application file for complete search history.

(56) References Cited

U.S. PATENT DOCUMENTS

| 5,557,515 | A | * | 9/1996 | Abbruzzese et al. | ........... 705/9 |
|---|---|---|---|---|---|
| 5,652,576 | A | | 7/1997 | Inokuma et al. | |
| 5,680,612 | A | | 10/1997 | Asada et al. | |
| 5,794,234 | A | | 8/1998 | Church et al. | |
| 5,940,809 | A | | 8/1999 | Musmanno et al. | |

(Continued)

OTHER PUBLICATIONS

Jim Fulcher, Make the connection, http://www.manufacturingsystems.com, Mar. 2000.*

*Primary Examiner*—Jason Dunham
(74) *Attorney, Agent, or Firm*—Finnegan, Henderson, Farabow, Garrett & Dunner, LLP (57) ABSTRACT

Methods and systems are provided for automatically filing records concerning business events in a computer system so that the records are accessible to a business application. An identification code is assigned to a business event having a data structure that is represented in the computer system. At least one set of input data, which is provided with a structure specific to a class of business events, is created from data concerning a business event. The at least one set of input data is transformed into a set of output data, which is accessible by at least two business applications. The set of output data is stored with the assigned identification code such that the set of output data can be fully or partly read by the at least two business applications by referring to the identification code.

22 Claims, 5 Drawing Sheets

U.S. PATENT DOCUMENTS

| | | | | |
|---|---|---|---|---|
| 5,974,148 | A * | 10/1999 | Stambler | 705/75 |
| 6,026,379 | A * | 2/2000 | Haller et al. | 705/34 |
| 6,058,413 | A * | 5/2000 | Flores et al. | 718/101 |
| 6,070,798 | A * | 6/2000 | Nethery | 235/462.01 |
| 6,233,565 | B1 * | 5/2001 | Lewis et al. | 705/35 |
| 6,990,466 | B1 * | 1/2006 | Hu | 705/35 |
| 7,107,236 | B2 * | 9/2006 | Lei | 705/27 |
| 7,203,658 | B1 * | 4/2007 | Gidwani et al. | 705/26 |
| 7,363,264 | B1 | 4/2008 | Doughty et al. | |
| 7,392,210 | B1 * | 6/2008 | MacKay et al. | 705/35 |
| 2002/0111820 | A1 * | 8/2002 | Massey | 705/1 |
| 2003/0212682 | A1 | 11/2003 | Nip | |
| 2003/0233321 | A1 * | 12/2003 | Scolini et al. | 705/40 |
| 2005/0075964 | A1 * | 4/2005 | Quinn et al. | 705/37 |
| 2005/0177507 | A1 * | 8/2005 | Bandych et al. | 705/40 |
| 2006/0155550 | A1 | 7/2006 | Von Zimmermann | |

* cited by examiner

Header

| ID | O. date | B. trans. | Number | User ID |
|---|---|---|---|---|
| 2131 | 10.04.2002 | Goods out | -3 | xyz |

511 512

Stock

| Group company | Article | Value in € |
|---|---|---|
| Company B | Product Y | -330 |

513

Cost and revenue

| Group company | Customer | Value in € |
|---|---|---|
| Company B | Company XYZ | 330 |

---

520

Header

| ID | O. date | B. trans. | Number | User ID |
|---|---|---|---|---|
| 213 II | 10.04.2002 | Goods out | -3 | xyz |

521 522

Stock

| Group company | Article | Value in € |
|---|---|---|
| Company B | Product Y | -300 |

523

Cost and revenue

| Group company | Customer | Value in € |
|---|---|---|
| Company B | Company XYZ | 300 |

---

530

Header

| ID | User ID | O. date | Article | B. trans. | Business year | Quarter |
|---|---|---|---|---|---|---|
| 213 I | xyz | 10.04.2002 | Product Y | Goods out | 2002 | II |

531 532

Stock

| Group company | Account | Number | Value in € | Value in US$ | Storage location |
|---|---|---|---|---|---|
| Company B | 100 | -3 | -330 | -320.1 | ABC |

533

Cost and revenue

| Group company | Account | Customer | Value in € | Value in US$ | Region |
|---|---|---|---|---|---|
| Company B | 400 | Company XYZ | 330 | 320.1 | Asia |

---

540

Header

| ID | User ID | O. date | Article | B. trans. | Business year | Quarter |
|---|---|---|---|---|---|---|
| 213 II | xyz | 10.04.2002 | Product Y | Goods out | 02/03 | I |

541 542

Stock

| Group company | Account | Number | Value in € | Value in US$ | Value in yen |
|---|---|---|---|---|---|
| Company B | 300 | -3 | -300 | -291 | -30000 |

543

Cost and revenue

| Group company | Account | Customer | Value in € | Value in US$ | Value in yen | Region |
|---|---|---|---|---|---|---|
| Company B | 500 | Company XYZ | 300 | 291 | 30000 | Asia |

FIG. 5

SYSTEMS AND METHOD FOR AUTOMATIC INTEGRATED DOCUMENT FILING WHEN LOGGING BUSINESS TRANSACTIONS

This application is a national stage filing under 35 U.S.C. 371 of International Application No. PCT/EP2003/009954, filed Sep. 8, 2003, which published in the German language, and which claims priority to EP 02021654.5, filed Sep. 27, 2002, EP 02021648.7, filed Sep. 27, 2002, DE 102 61123.8, filed Dec. 20, 2002, and DE 10261121.1, filed Dec. 20, 2002.

The invention relates to a method for automatically filing documents relating to business transactions, in which a computer system is used to store data relating to a business transaction for access using a business application and in which a business transaction is assigned an identification code, with one or more different classes of business transactions having different data structures being mapped in the computer system.

Methods of the stated type are known from the business accounting function, for example. In particular, such methods are carried out automatically using computer systems, preferably using database systems.

A fundamental task of an accounting function is the logging of all operative processes in a company's value added chain and said company's accounting processes. In this case, the different information is put into a standard language (e.g. accounts concept) and assessed. In this context, a business transaction means a business management operation in which financial assets are either increased (income) or reduced (expenditure). Such business transactions can in turn be assigned to particular classes within which the data to be assigned to the individual business transactions have an approximately uniform structure. Typical classes are personnel, materials management and production, for example.

To ensure that the accounting function is in accordance with regulations, logging must be carried out in full and correctly. The document principle serves as proof of this accordance with regulations. This involves any logging of a business transaction on the basis of a particular business management assessment method being documented by means of a document which has an associated identification code. Examples of different forms of business management assessment may be: assessing a business transaction in accordance with the German commercial law or in accordance with IAS, assessing a business transaction between two group companies in accordance with the legal or group-internal provisions, assessing a business transaction in different currencies.

The second example mentioned will be explained in more detail: two companies A and B from the same group are assumed. Company A sells to company B a product X at a price of Y, the production costs being Z. In accordance with the legal regulations, this transaction would be booked as follows: the balance sheet account of company B for the product X would receive an increase of Y on the credit side, and a debit amount of likewise Y would appear in the profit and loss account. In accordance with a group-internal regulation, an increase of Z might appear in the balance sheet account of B for the product X. A debit of Y might again appear in the P&L, but also a credit of Y-Z.

If a particular business transaction is assessed using a plurality of different business management methods, then accordingly a plurality of different documents are produced. This document principle ensures auditing of the aggregate data, i.e. those summed over particular features, for the invoices using the documents relating to the process data.

To achieve the different aims, the accounting function uses business management methods to carry out business management processes, subsequently also called business applications, business management accounting operations (e.g. auditing of results, cost accounting, balance sheet, profit and loss account) and to manage various books (e.g. general accounting, assets accounting). The different accounts and books have different demands on promptness and degree of detail. Nevertheless, coordinateability between the accounts (business applications) is of great importance for accounting, which is intended to meet the principles of orderly accounting through software, and for the ability for the results to be used.

A further demand on accounting function is that the observation and logging do not, as far as possible, hinder the performance of the logistical processes, which are posting operations mapping the inward and outward movements of goods and services.

A piece of software for assisting business processes, referred to below as ERP (Enterprise Resource Planning) software, meets the demands on an accounting function typically by performing the logistical processes and the accounting function for a company in the same system, the ERP system. The accounting function is closely linked to the logistical processes and performs direct and transactional concurrent logging, which means that a document is not stored as such until the data which the document needs to contain are complete. The logistical processes are mapped in the ERP software and are therefore normally also linked to the concepts of the accounting function (e.g. account). The concepts are implemented in the software through fixed data structures. In this case, the various accounts in the accounting function update their own documents for logging purposes.

This practice has a series of drawbacks for data processing:

a) the prerequisite that all logistical processes run within a single ERP system is normally not satisfied. Many companies have heterogeneous system landscapes which have grown historically and handle many processes using special systems. The local ERP system is frequently insufficiently prepared for logging such externally running processes, which usually do not know the concepts of the accounting function. Extensive transfer programs are therefore frequently necessary.

b) The fixed data structures in the local ERP system mean that companies are forced to align their business management concepts with the nomenclature and the technical properties of the local ERP system. This is a great problem particularly in the case of the heterogeneous system landscapes presented in a).

c) The individual document updating for the various accounts in different business applications results in a very large volume of data and time involvement for updating. Since the accounts have individual structures, considerable coordination problems also arise between the accounts.

d) The direct, transactional updating of the accounting function burdens the performance of the computer systems used and consequently of the logistical data processing processes to be handled. In particular, errors which arise in the logging in the accounting function, for example owing to incorrect system setting, prevent the processes from being performed.

Therefore, systems and methods are needed to improve upon the method cited at the outset such that the stated drawbacks are eliminated at least in part.

SUMMARY

In a method consistent with an embodiment of the present invention, a first step involves at least one input data record being produced from data relating to a business transaction, said input data record having a structure which is specific to one or the or each different class of business transactions and to one or more business applications.

A second step involves the at least one input data record being transformed into an output data record which is designed for access by at least two business applications.

Further, a third step involves the output data record being stored with its associated identification code, so that the output data record can be read in full or in part by the at least two business applications by referring to the identification code.

Embodiments consistent with the present invention automatically file documents relating to business transactions. In one embodiment, a computer system is provided that stores data relating to a business transaction for access using a business application and in which a business transaction is assigned an identification code, with one or more different classes of business transactions having different data structures being mapped in the computer system.

A first step involves at least one input data record being produced from data relating to a business transaction, said input data record having a structure which is specific to one or the or each different class of business transactions and to one or more business applications.

A second step involves the at least one input data record being transformed into an output data record which is designed for access by at least two business applications.

Further, a third step involves the output data record being stored with its associated identification code, so that the output data record can be read in full or in part by the at least two business applications by referring to the identification code.

Embodiments of the invention also encompass apparatus, computer programs and computer program products, and also an electronic data structure or an electronic document which can be obtained or has been obtained in accordance with methods based on the invention. The invention also covers computer programs on or embedded in a data storage medium which can be used to load the programs into a computer and to carry out methods consistent with the invention. The program may be in the form of a source code, an object code or a hybrid code, in fully or partially compiled form. The data storage medium may be any unit or apparatus which is suitable for holding a program: ROM, e.g. CD-ROM or a semiconductor ROM or DVD ROM, a magnetic storage medium, e.g. a floppy disk or hard disk. Alternatively, the program may be embedded in an integrated circuit which is provided for carrying out methods according to the invention.

The inventive method and also the program code for carrying out the method are subsequently also referred to as "accounting engine", and the output data record is also subsequently referred to as "document".

The inventive method can be used as a tool in a piece of ERP software for the accounting function for the purpose of electronic document filing by private organizations or by public organizations (together called "company" for short). It is carried out using a computer system. A computer system within the context of the invention may either be just one computer (such as a PC, laptop) or may comprise a network containing a plurality of computers. This is also to be understood to mean a network which is formed using the Internet. Preferably, the accounting engine is used in a computer network within a company. In such a computer system in a company, data relating to the individual business transactions can be stored using a piece of ERP software, for example. When executed in the computer system, the accounting engine in the form of program code causes data relating to an individual business transaction (output data) to be used to produce an input data record which is in turn transformed into an output data record (document) which can be read by a plurality of application programs in the accounting function (business applications), which are executed on the computer system, and is stored separately from the output data. This allows redundancy-free document filing with a great saving on storage space. The output data can actually be stored in the computer system or can be input by a user using a user interface and immediately processed further, or can be imported using remote data transmission. The transformation operation involves the input data being altered or complemented in full or in part, depending on the requirements of different business applications, using further data which are stored in the computer system. In this context, it is possible for one business application to set the business management procedure to use for assessing a business transaction. Another business application can be used to choose another kind of assessment. This can result in one and the same business transaction being assessed in a plurality of different ways. For one business transaction, however, just one document is produced per assessment, but a plurality of business applications may have read access to said document. Although this one document contains more data than would be necessary if just one business application needed to access the document, it generates fewer data overall than would be generated if a separate document were produced for each of the different business applications, which do not always need to prescribe different assessments, of course. This corresponds to the feature of being designed "for access by at least two business registrations".

In a first preferred embodiment, the first step in the inventive method is performed using a first program module, and the second step is performed using a second program module. In this case, the input data record having the specific structure is transferred from the first program module via an interface to the second program module. In addition, the or each business application can be in the form of a third or further program module and can interact with the second program module such that the transformation operation in the second step of the inventive method can be set by the or each third program module using an interface. This configurability of the document can be implemented, by way of example, by virtue of a screen being used to display to a user a list containing the selectable data or fields or else functions from which, by means of interaction (e.g. keyboard or mouse click or voice input) he can select one or more data items, fields or functions which are to be stored in the document (data, fields) or which are to be used when transforming the input data record into the document (functions). With particular preference, the second program module is in a form such that it can read data, which can be selected by the at least two business applications, from the document upon a data request from the or each third program module and can transfer said data to the or each third and/or a further program module via an interface for the purpose of further processing and/or for the purpose of display. These selectable data can be selected by the third or a further program module. The document obtained in the second step of the inventive method is preferably stored on a transactional basis. Advantageously, the document has, for a plurality of business applications, a specific database structure having one or more tables. It is particularly advantageous if the document has, for different journals in the accounting function, different data areas. In this context, journals are tabular summaries of posting records, e.g. from the areas of claims, liabilities, costs, revenue, goods inwards, goods outward etc. By way of example, the document may have a first data area for costs and revenue, a second for stock of materials, a third for claims and liabilities etc. The first area may contain details regarding: customer, product, cost center etc., the second may contain details regarding product, storage type, storage location etc., the third may contain details regarding: customer etc. These details serve merely for explanation and can be altered or complemented as required. In addition, the document may contain a further area ("header area") containing data which are common to a plurality of journals, e.g.: the identification code (ID), the respective legal unit (company), a posting date, an editing date, an editor etc. The different data areas can then store that information from the business transaction which relates to the respective journal. The filing of the document in a physical memory can advantageously be implemented using a database structure having one or more tables.

In a further preferred embodiment, at least one function is applied to the data contained in the document. Such a function may be, by way of example, checking the document balance or a customer group contained in the document. Preferably, such functions are filed in selectable form in a program module. With particular preference, at least one function can be configured using a further program module. The selectability of the functions can be implemented, by way of example, by virtue of a screen being used to display to a user a list containing the selectable functions from which he can select one or more functions by means of interaction (e.g. keyboard or mouse click or voice input). Alternatively, there may be functions available which are applied to all of the documents as standard. The configurability of the at least one function can be implemented by virtue of said function's parameters being selectable, e.g. in a similar manner to what has already been described. If, by way of example, one document stores postings for a plurality of legal units, then, by way of example, the function for checking the balance can be configured, for example by means of a selection table, such that it checks only the account balances of the selected unit.

The invention is explained in more detail below with reference to FIGS. 1 and 2. This does not intend to limit the invention in any way.

BRIEF DESCRIPTION OF THE DRAWINGS

The accompanying drawings, which are incorporated in and constitute a part of this specification, illustrate embodiments of the invention and together with the description, serve to explain the principles of the invention.

DETAILED DESCRIPTION

Figure 1:
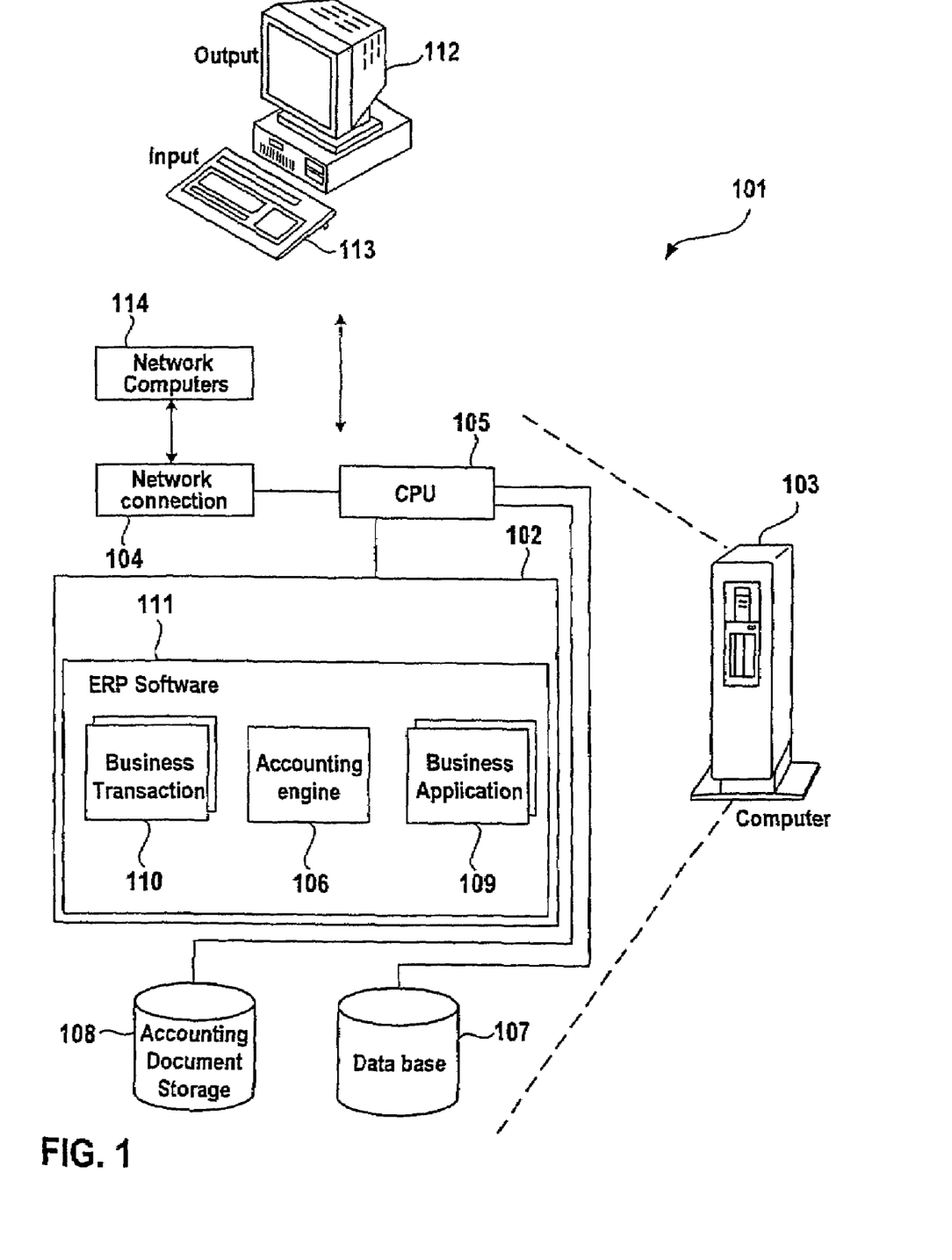
FIG. 1 is an illustration of an exemplary computer system for performing a method consistent with embodiments of the present invention.

FIG. 1 shows a computer system 101 having a computer 103, which has a CPU 105, and a main memory 102 into which a piece of ERP software 111 has been loaded for execution by the CPU 105. The ERP software 111 comprises one or more program modules 110 for handling and editing data relating to business transactions, an accounting engine 106 in the form of a program module and one or more business applications in the form of program modules 109. The computer system 101 also comprises: input means 113, output means 112, a network connection 104 for connecting the computer 103 to further identical or different computers 114 in the form of a network, where the network computers 114 may serve as further input and/or output units for inputting and/or outputting data relating to business transactions or for configuring the accounting engine and for showing input masks or for outputting results or for executing the accounting engine. A database 107 is also present, which contains data relating to the business transactions and business applications and can be accessed by the ERP software 111, and also a memory unit 108 for storing the documents, the memory unit 108 also being able to be part of the database 107. The program modules 106, 109, 110 may likewise access the database 107, and the program modules 106 and 109 may additionally access the document memory 108.

Such a computer system can be used to carry out the inventive method in the manner described below. One of the modules 110 transfers data relating to a particular business transaction with an identification code (ID) to the accounting engine 106. In this case, the data may already be available in the database 107 or may have been input using the input and output means 113, 112, 114 and stored in the main memory 102. The accounting engine 106 transforms the transferred data by adding data from the database 107 and/or by altering or converting the transferred data into a document which meets the demands of a business management document and which can be read by the different business applications 109. Next, the document is stored in the memory unit 108. To perform the transformation, the database 107 contains all of the information which is relevant from a business management point of view. The type of transformation and the type of data which can be stored in the document can be set specifically in each case using the modules 109.

A further embodiment of the accounting engine will now be described in more detail with reference to FIG. 2. Here, the angular rectangles represent program code, and the rounded rectangles represent data structures. The accounting engine shown in FIG. 2 has a first program module 210 and a second program module 220. From a business transaction, the first program module 210 receives, via a program module 250 which is designed specifically for a class of business transactions, data relating to this business transaction via an interface 271. Such data may be, by way of example: nature, number, type of a product sold or, as an example from production, the removal of a number of a goods item or of a raw material from a depot for a particular workplace in a particular production facility or the payment of wages to an employee. These data can be loaded via storage media or can be input using input means (e.g. keyboard, screen), so to speak online. The data may also be transferred, by way of example, by transferring the addresses of the data in question. In addition, an identification code 251 (ID) is transferred at the same time. The first program module 210 contains one or more generation modules 211 which take the data for the business transaction and generate an input data record 212 which has a structure which is specific to all of the classes of business transactions which are mapped in the respective ERP software. The generation module 211 is likewise designed to be specific to each class of business transactions 250. The association between the modules 250 and the modules 211 can be implemented using a table, for example. The structure of the input data record 212 has a header area containing general data such as the ID 251, account, cost center, user, time stamp, posting date, legal unit etc. and also data relating to the class of the business transaction. The remaining part of the structure contains the data which relate to the respective specific business transaction. The general data may in part also be read from a database via an interface 272 using a database application 260. The configuration of the modules 211, their association with the modules 250 and the stipulation of the structure of the input data record 212 are expediently performed when the accounting engine is installed on the respective company's EDP system.

The input data record 212 generated in this manner is transferred from the first program module 210 via an interface 213 to the second program module 220. The latter contains a transformation module 221 in which a document processor 222 transforms the input data record 212 into an output data record (document) 226 whose structure is specifically shaped such that it can be accessed from at least two business applications. With this transformation, the business transaction's data contained in the input data record 212 are converted into the appropriate data for the accounting function.

This transformation is performed by adding data and/or by converting data from the input data record. The addition is performed using the database application 260, which can be accessed by the document processor via an interface 273. Examples of such added data are a customer group or a price. Data can be converted, by way of example, such that a transferred number of items and the item price, which is available from the database application 260, are taken and a turnover is calculated. This can then be stored in the document 226 in a further step for access by different business applications.

Different business applications are, by way of example, applications in the accounting function such as profitability analysis, cost accounting, balance sheet, profit and loss accounting, or applications in control. To meet the requirement of accessibility for at least two business applications, the document 226 has a header area 226a and also different data areas 226b, 226c with structured contents, said data areas being provided for read access by individual or a plurality of business applications. The header area contains the general data in the input data record 212 and also the data added by the document processor 221 from the database application 260. The different data areas 226b, 226c contain the data for the individual journals in the accounting function. By way of example, the area 262b represents the cost and revenue journal. Which data in the individual areas 226 can be viewed from which business applications is configurable from the respective business application. This is explained in more detail below.

Figure 2:
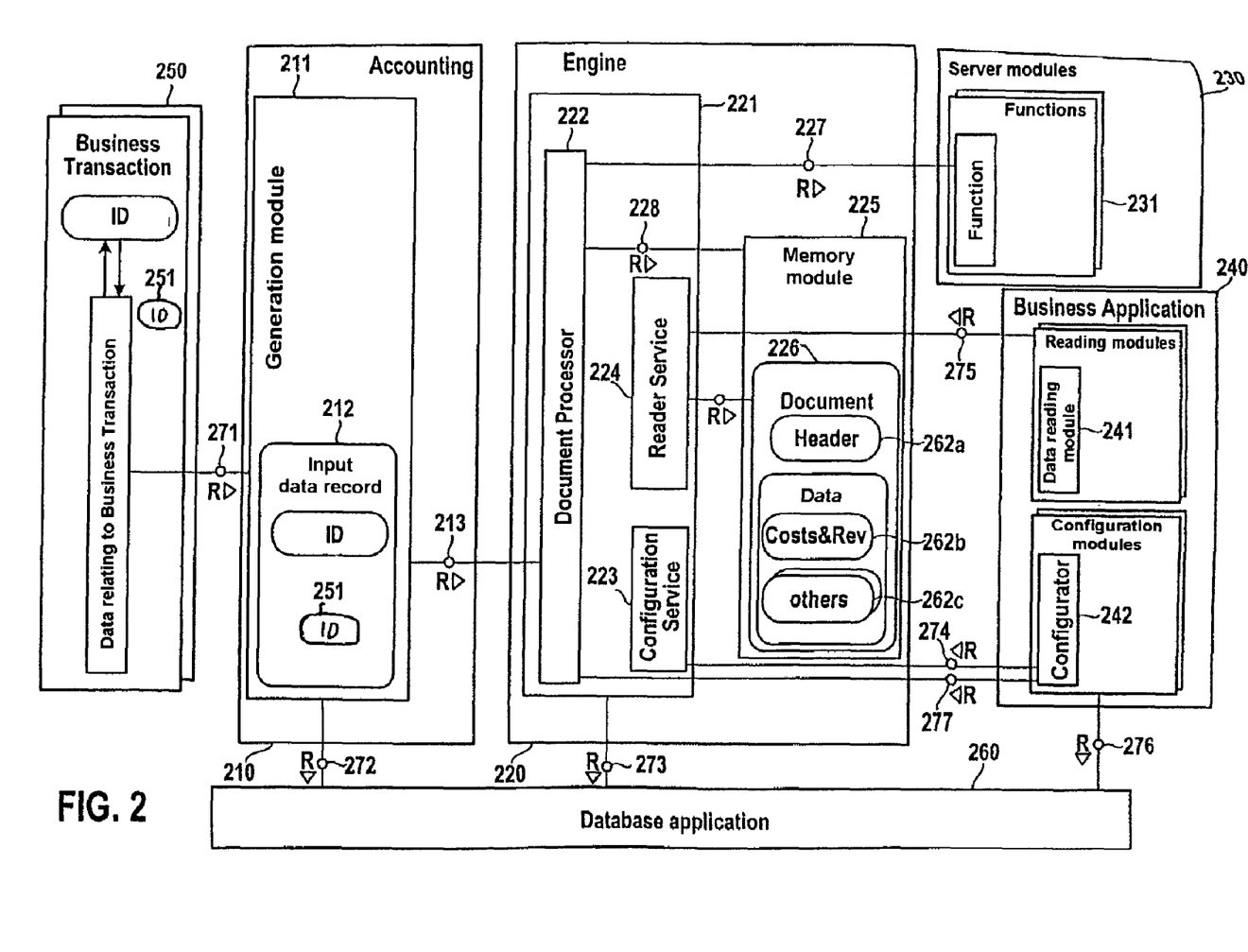
FIG. 2 is an exemplary embodiment of a computer program for carrying out the method using a block diagram.

In the example shown in FIG. 2, a business application is in the form of a third program module 240. This third program module 240 contains a configuration module 242 which interacts with a configuration service 223 in the transformation module via an interface 274 such that the configuration module 242 can be used to determine which data are written to the data area in question (226a or 226b) in the document 226 for the purpose of access by a particular business application and may also be read by the respective third program module 240. The data required for transformation may be filed in a database in table form. The names of the appropriate fields in the table can be selected via an interface 276 using the database application 260. The names of the selected fields are transferred to the configuration service 223 via an interface 274. The contents (data) of the fields selected in this manner are then read from the database application 260 by the transformation module 221 via the interface 273 and are added to the document or used for transformation by the document processor 222. In addition, the configuration module 242 can be used to determine what business management assessment needs to be performed for the input data record and which of the results obtained need to be stored in the document, e.g. what currency needs to be used for a particular kind of posting.

Once the input data record 212 has been transformed into the document data record 226, then a server module 230 can be used to apply one or more functions 231 to the document data record 226. By way of example, one or more functions 231 can be used to check whether the balance of debits and credits is equal to zero, whether stated tax rates are correct, whether all obligatory fields have been filled, account details are correct, whether a customer group has been determined correctly or whether there are other errors or a lack of concurrence with the principles of orderly accounting. These functions 231 are filed in the service module 230 and can be selected via interfaces 277, 227 using the configuration module 242 for the purpose of application to the document in question and for the business application in question.

The document 226 with its structure data, with the identification code 251 and also with the settings configured by the third program modules 240, 242 is stored by a persistency server module 225. Filing in a physical memory is effected in the form of a database structure having one or more tables. The document processor 222 can access the structure data via an interface 228 and can use said structure data in order to transform an input data record 212 into a document 226 in a particular class of business transactions. The interfaces 271, 213 are designed specifically for each class of business transactions.

For the purpose of reading the data, the or each third program module 240 contains a reading module 241 which interacts with a reading service module 224 via an interface 275, the reading service 224 providing the reading module 241 with the data which have been selected using the configuration module 242. Using the configuration module 242, it is likewise possible to set, in the manner indicated above, what general data or fields are added to the document using the database application 260 and can also be read.

Figure 3:
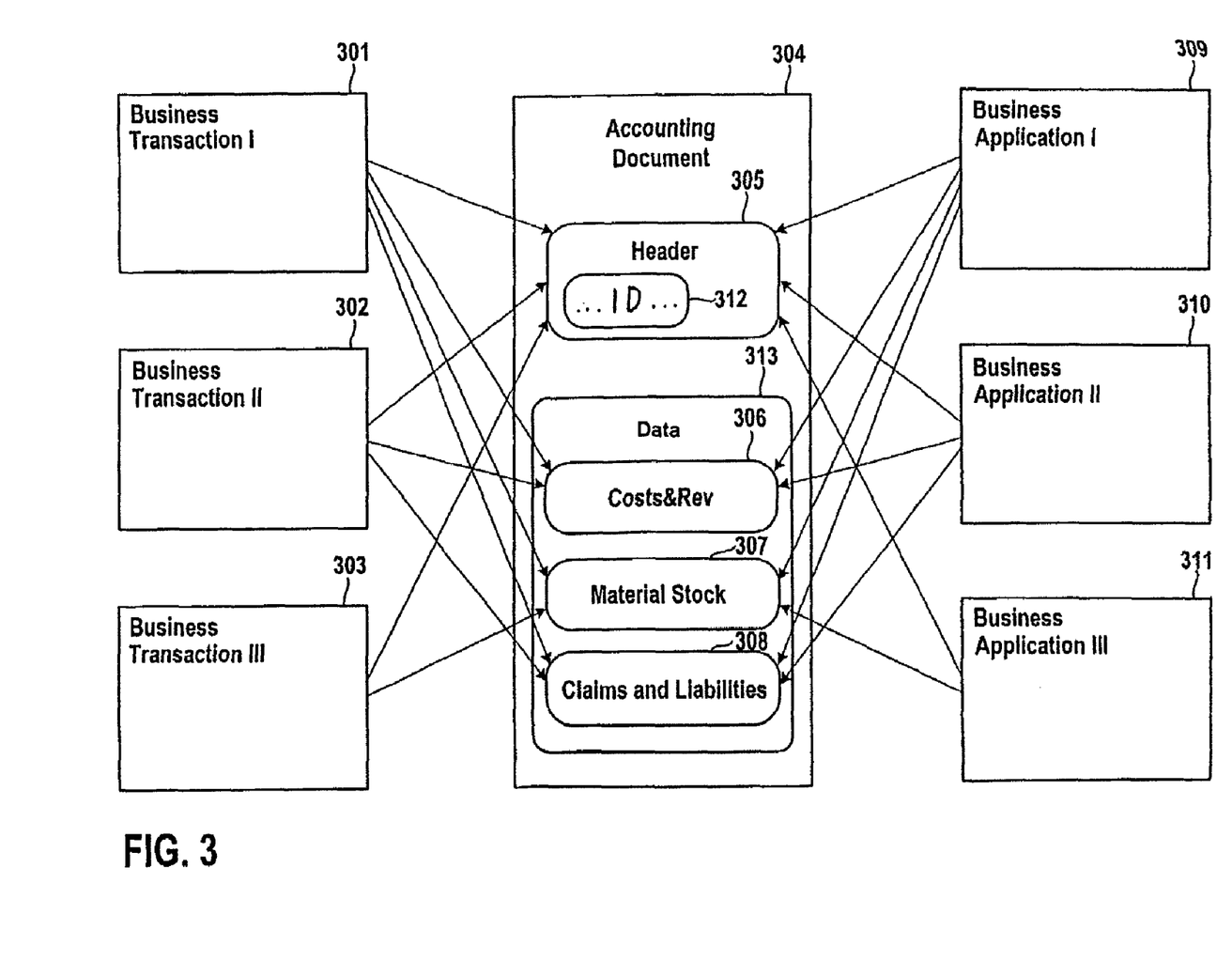
FIG. 3 is an illustration of an exemplary data structure of a document with data sources and accesses by business applications.

A further explanation of the invention will be given with reference to FIG. 3. The figure shows a schematic illustration of the data structure of a document 304 together with advice of what the options are for transforming data for business transactions 301, 302, 303 into particular data areas 306, 307, 308 in the document 304. The figure likewise shows what options there are for business applications 309, 310, 311 to access the data areas 306, 307, 308 in the document 304. The options shown are in no way to be understood to be a conclusive listing, however, but rather are merely exemplary embodiments of the invention. The electronic document 304 has a header area 305 and a data area 313. The header area 305 contains the ID 312 and also other general data relating to a business transaction 301, 302, 303. It should be mentioned at this point that a separate document is created for each of the business transactions 301, 302, 303. However, these three separate documents have been summarized in the document 304 in order to simplify the illustration in the drawing. The data area 313 has different areas 306, 307, 308 containing data relating to different journals in the accounting function: an area 306 for data relating to cost and revenue, an area 307 relating to warehousing and also an area 308 relating to claims and liabilities. For a business transaction such as the business transaction 301, however, a situation may also arise generally in which data are produced for the header area and for all possible combinations of journal areas, such as the areas 306, 307, 308 etc. This is explained in more detail below with reference to FIGS. 4 and 5. This does not intend any kind of limitation. In contrast to FIGS. 1-3, FIGS. 4, 5 do not identify data structures in rounded form, since no program modules are shown.

Figure 4:
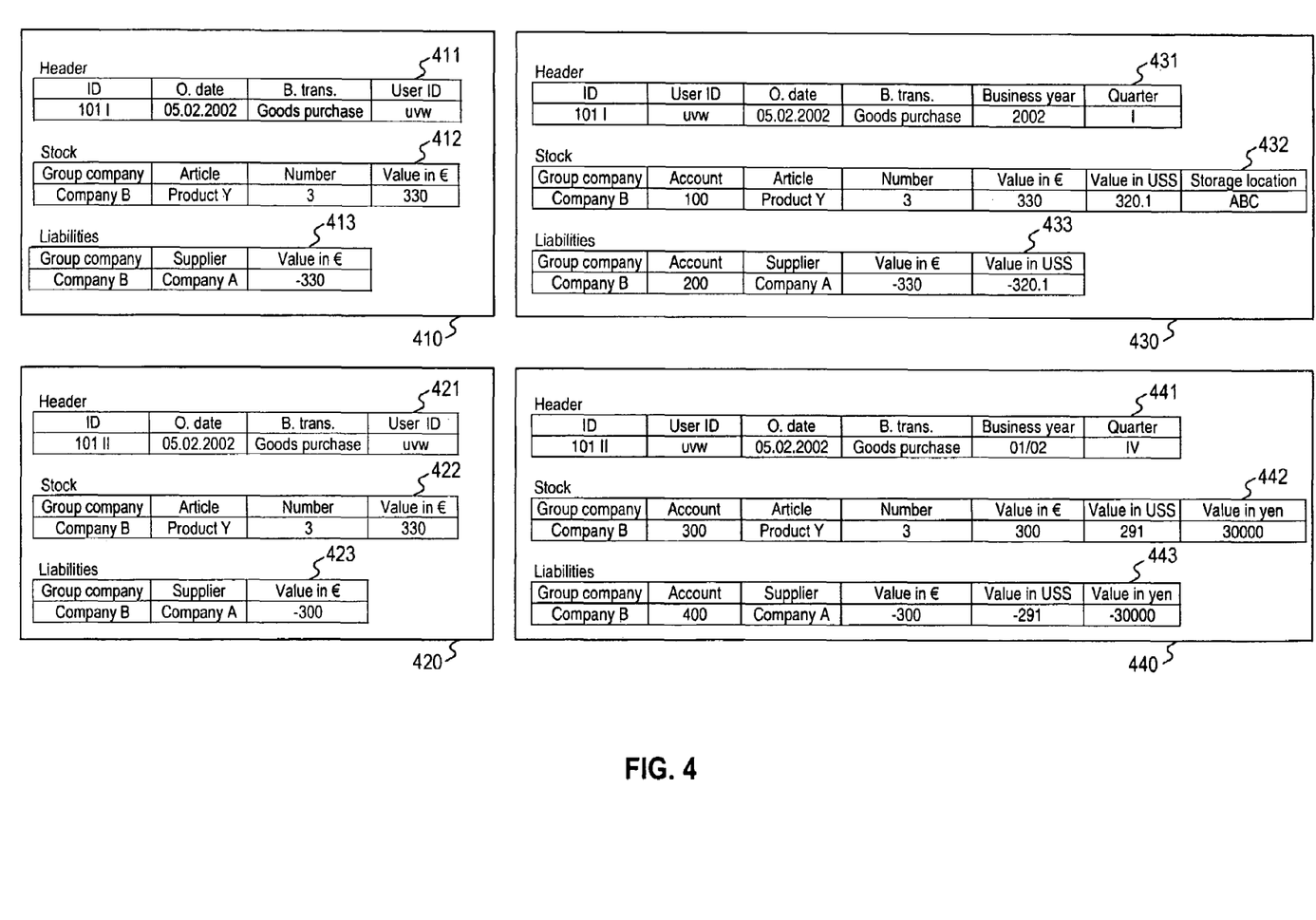
FIG. 4 is an illustration of exemplary structures and contents of an input data record and a document for a purchase of goods example.

The assumption is a group company based in Japan, a subsidiary company A in the USA and a subsidiary company B in Europe. A first business transaction assumed is that B purchases from A 3 items of a product Y at an item price of 110£. The production costs at A are 100 £/item, and the sales mark-up is 10%. The transaction is considered by the accounting function in company B and is assessed from two different points of view, specifically from the point of view of company B (business application I, BA I) and from the point of view of the group (business application II, BA II). From a business management point of view, the stock of goods is increased at company B and a liability amounting to the purchase price arises.

The program module 250 (cf. FIG. 2) is used to transfer the following data for this business transaction to the first module 210: an ID (101), an order date (May 2, 2002), a descriptor for the business transaction, (goods purchase), article descriptor (product Y), number of items (3) and purchase price (330). The program module 210 takes these data and generates two input data records 410, 420 which are specific to this class of business transactions: a first 410 for the BA I and a second 420 for the BA II. Both have the same structure: a respective header area 411, 421 and a respective data area, the latter comprising the stock 412, 422 and liabilities 413, 423 journals. All of the areas are implemented in the form of single-line tables. The header area has—in the example—the fields with names ID, posting date, business transaction, in which the corresponding transferred data have been entered, the module 210 generating from the transferred-first-ID a second and third ID which clearly identifies the two input data records, specifically by adding "I" and "II", respectively, in the example, in line with the BA, to the first ID. In addition, the module 210 has also added a field UserID, which contains an identifier for the operative in question. This identifier has been taken from the database application 260. The stock data area 412 contains the fields group company, article, number, value in £, the group company field in this case being filled from the database and the remaining fields being filled from the transferred data. The content of the value in £ field corresponds to the purchase price. In this regard, it should be noted that debit postings appear as positive figures and credit postings appear as negative figures. The liabilities area 413 contains the fields group company, supplier and value in £, the first two mentioned containing fields with values from the database application 260.

The input data record 420 for the BA II differs from the input data record 410 for the BA II not in the structural design but rather just in the content of the value in £ fields. The reason for this is that the sales mark-up is not relevant to the assessment from the group company point of view, and therefore the module 210 for generating the input data record for this BA II has been configured such that it uses the database application 260 to read the value for the production costs from a database which can be accessed throughout the group, and enters the stock line 422 and liabilities 423 into the value in e fields.

The transformation module 221 takes the first input data record 410 and generates a first document 430, and takes the second input data record 420 and generates a document 440.

The two documents have different data structures which arose from the structure of the input data records through the addition or omission of individual or a plurality of fields. Header areas 431, 441 are present and also the stock 432, 442 and liabilities 433, 443 data areas.

The header areas 431, 441 have the same structure, but have a different content in individual fields. They contain the fields of the header area in the input data record and also additional fields for business year and quarter. From the point of view of the European company B, the business year is the same as the calendar year. The module 221 takes the knowledge of the company and of the posting date and ascertains that the business year is the year 2002 and that the quarter is the first quarter, and stores these values in the appropriate fields.

The stock areas 432 and 442 have different structures. The area 432 has the fields corresponding to 412 and also fields for account, value in US$ and storage location. Account and storage location are ascertained by the module 221 from the database application 260, and the value in US$ is ascertained from the value in £ using a conversion factor from the database application 260. A "value in US$" may be useful if the vendor is based in the USA—as in the example. The stock area 442 has almost the same structure, but instead of the storage location field there is a value in yen field. This may make sense if the group company is based in Japan and has to balance accounts in accordance with Japanese regulations, and if information relating to the storage location is not relevant from a group point of view.

The liabilities areas 433 and 443 likewise have different structures. Area 433 contains, in addition to the fields corresponding to 413, the fields account and value in US$, whose content is ascertained in a similar manner to that described above. The same applies to the area 443, which also has a value in yen field, however.

Figure 5:
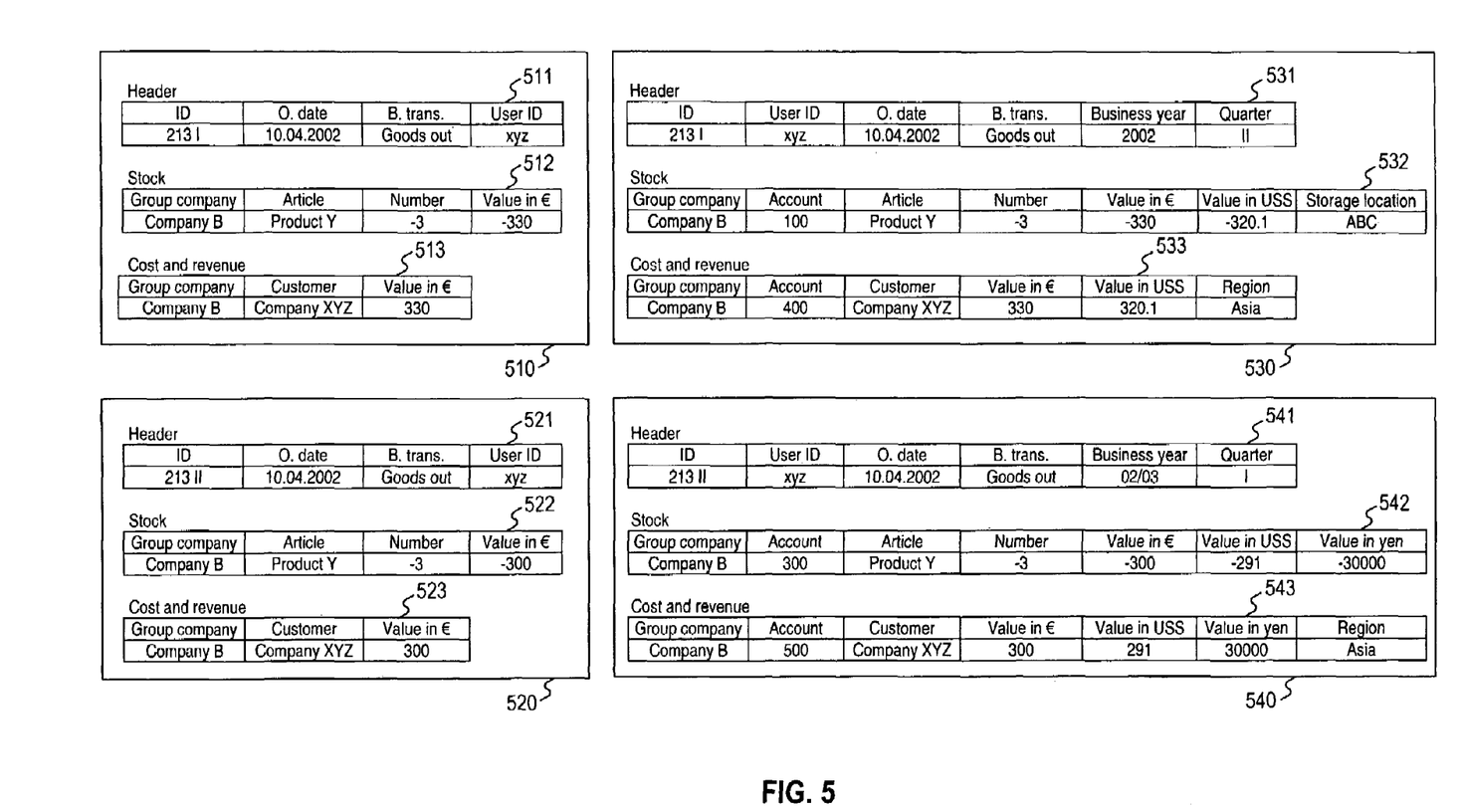
FIG. 5 shows exemplary structures and contents of an input data record and a document for a sale of goods example.

A further example of a business transaction which may be used is the sale of said goods by B to a non-European third party (company XYZ), specifically just the delivery of the goods. The invoice is not dealt with. From a business management point of view, in this case the stock of goods is reduced at company B, and costs amounting to the production price arise.

The program module 250 (cf. FIG. 2) is used to transfer the following data for this business transaction to the first module 210: an ID (213), an order date (Oct. 4, 2002), a descriptor for the business transaction, (goods output), article descriptor (product Y), number of items (3). In a similar manner to the example above, two output data records 510, 520 are generated for the BA I and BA II, and two documents 530, 540 are generated from these, the remaining data required being ascertained using the database application 260. The header areas 511, 521, 531, 541 correspond to those in the aforementioned example. Only the contents have been aligned. The same applies to the stock areas 512, 522, 532, 542. A liabilities area is not necessary for this class of business transactions. Instead, the data areas contain cost and revenue journals 513, 523, 533, 543. These comprise, for the input data records 510, 520, the fields group company, customer (the third-party company) and value in £. For the document 530, value in US$ and region fields have also been added, and additionally value in yen for the document 540. The contents are obtained from what has already been said and the data in the second example. At this juncture, it will be pointed out that the contents of the account fields for the stock area are identical within a BA in the examples, but are different from BA I to BA II. This need not be the case generally.

The four documents are stored and can each be read by a plurality of business applications 240, e.g. by applications in stock control, contribution margin accounting or general balance sheet accounting. In line with the invention, it is possible to set which fields can be read by which business applications. It is thus possible for a stock control application to have access to all or individual fields in the header areas and in the stock areas. This configuration is expediently brought about when the software is set up.

In a piece of ERP software, the accounting engine is a central component for the integrated logging of business transactions in the form of itemization using the document. One or more business applications can form specific, aggregate views onto the itemizations. The documents can be filed in redundancy-free fashion for a particular business management assessment, which allows a considerable amount of storage space to be saved, depending on the number of documents and business applications, even though the need for storage space increases for the individual document. In addition, the coordination involvement between the program modules of the business applications is reduced. The document structure and the method sequence can be configured by the user.

Using the accounting engine in the accounting function allows additional business management benefit to be generated in a company, since the accounting engine can be used as the sole interface between all operative business transactions and accounting-internal business applications, and it documents the documents created in a central file. The identification code stored at the same time can be used both for clear auditing and for cancelling business transactions. If a plurality of business applications use the accounting engine's document memory, then it is possible to configure a common, consistent document from the different business applications. This results in inherent coordination between the business applications involved.

In an ERP software system, the accounting engine allows the operative business transactions to be isolated from the applications of the accounting function. Such isolation advantageously allows the accounting function to be coupled asynchronously to logistical systems for data purposes.

The accounting engine also makes it possible to adopt business transactions without any business management assessment, e.g. goods issue without indication of price, together with their process-specific concepts. It can assess incoming business transactions according to the stipulations of the accounting function. Documents from different assessments can be kept isolated logically. Preferably, an independent document is generated for each assessment.

The different programs or program modules may have been designed using any of a number of known techniques or in connection with existing software. By way of example, modules may have been written in ®Java, C++, HTML, XML, SAP R/3 or ABAP or even in HTML with stored JAVA applets. Single instances or a plurality of the modules may also be integrated in existing e-mail or browser software, for example for data input.

The patent claims submitted with the application are wording proposals without prejudice for obtaining continued patent protection. The applicant reserves the right to claim further combinations of features previously disclosed only in the description or other arbitrary combinations of features disclosed in the description. Expressions in brackets in the claims do not represent limiting features.

Back references used in subclaims point to the further development of the subject matter of the main claim; they are not to be understood as dispensing with the attainment of independent, objective protection for the combination of features in the subclaims containing a back reference.

It will be noted that when features are linked by "or", this "or" is respectively to be understood firstly as being a mathematical "or" and secondly as an "or" which excludes the respective other possibility.

It will also be pointed out that the statements relating to all known arrangements which do not refer to particular printed documents are known primarily to the applicant or inventor, which means that the applicant or inventor reserves the right to protect them provided that they are not also known to the public.

While certain features and embodiments of the invention have been described, other embodiments of the invention will be apparent to those skilled in the art from consideration of the specification and practice of the embodiments of the invention disclosed herein. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

The invention claimed is:

1. A method for automatically filing documents relating to business transactions using a computer system, the method comprising:
   receiving business data about a business transaction;
   producing at least one input data record from the business data comprising an input header with general data, the input data record having a structure specific to a class of the business transaction;
   transforming, by a processor, the at least one input data record into an output data record accessible by business applications, further comprising:
      generating an output header for the output data record, the output header including the general data from the input header;
      reading additional data, relating to the business transaction, from a database application;
      adding the additional data to the output header;
      formatting a first data area of the output data record, such that the first data area is exclusively compatible with a first of the business applications, and
      formatting a second data area of the output data record such that the second data area is exclusively compatible with a second of the business applications; and
   storing the output data record in a memory device with an identification code such that the output data record is available to the first and second business applications by referring to the identification code.

2. The method of claim 1, wherein the producing step is performed using a first program module, the transforming step is performed using a second program module, and the input data record having the structure is transferred from the first program module via an interface to the second program module.

3. The method of claim 2, wherein the business applications are stored as a third program module.

4. The method of claim 3, wherein the second program module is in a form such that the transforming step can be set via an interface using the third program module.

5. The method of claim 3, wherein the second program module is configured to read data, which can be selected using the at least two business applications, from the output data record upon a data request from the third program module and can transfer the data to the third program module via an interface for further processing or display.

6. The method of claim 5, wherein the selectable data can be selected by the third program module.

7. The method of claim 1, wherein the output data record is stored on a transactional basis.

8. The method of claim 1, wherein the output data record includes, for the business applications, a database structure having one or more tables.

9. The method of claim 1, wherein the output data record includes, for different journals in accounting, different data areas.

10. The method of claim 1, wherein the first and second business applications each assess the business transaction using different business management methods.

11. A computer system for automatically filing documents relating to business transactions using a computer system, the computer system comprising:
a processor programmed to execute program modules, said program modules comprising:
a first program module configured to store at least one input data record from business data related to a business transaction, the input data record comprising an input header with general data and having a structure specific to a class of the business transaction;
a second program module that transforms the at least one input data record into an output data record accessible by business applications, wherein the output data record includes:
an output header including the general data from the input header and additional data from a database application, the additional data relating to the business transaction;
a first data area formatted for exclusive compatibility with a first of the business applications, and
a second data area formatted for exclusive compatibility with a second of the business applications; and
a storage module that stores the output data record in a memory device with an identification code, wherein the different data areas in the output data record can be read by the first and second business applications depending on the data requirements of the first and second business applications by referring to the identification code.

12. The computer system of claim 11, wherein the input data record having the structure is transferred from the first program module via an interface to the second program module.

13. The computer system of claim 11, wherein the business applications are stored in a third program module.

14. The computer system of claim 13, wherein the second program module transforms the at least one input data record into the output data record via an interface that uses the third program module.

15. The computer system of claim 13, wherein the second program module reads data, which can be selected using the first and second business applications, from the output data record upon a data request from the third program module and can transfer the data to the third program module via an interface for further processing or display.

16. The computer system of claim 15, wherein the selectable data can be selected by the third program module.

17. The computer system of claim 11, wherein the output data record is stored on a transactional basis.

18. The computer system of claim 11, wherein the output data record includes for the business applications, a database structure having one or more tables.

19. The computer system of claim 11, wherein the output data record includes for different journals in accounting, different data areas.

20. The computer system of claim 11, wherein the first and second business applications each assess the business transaction using different business management methods.

21. A computer-readable medium comprising a computer program, which, when executed by a processor, causes the processor to perform a method, the method comprising:
receiving business data about a business transaction;
producing at least one input data record from the business data comprising an input header with general data, the input data record having a structure specific to a class of the business transaction;
transforming the at least one input data record into an output data record accessible by business applications, further comprising:
generating an output header for the output data record, the output header including the general data from the input header;
reading additional data, relating to the business transaction, from a database application;
adding the additional data to the output header;
formatting a first data area of the output data record, such that the first data area is exclusively compatible with a first of the business applications, and
formatting a second data area of the output data record, such that the second data area is exclusively compatible with a second of the business applications; and
storing the output data record with an identification code such that the output data record is available to the first and second business applications by referring to the identification code.

22. The computer program of claim 21, wherein the first and second business applications each assess the business transaction using different business management methods.

* * * * *